J. P. SMITH.
Turning and Planing Tool.
No. 83,560.            Patented Oct. 27, 1868.
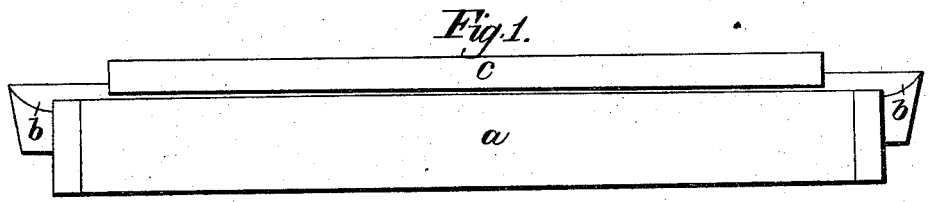
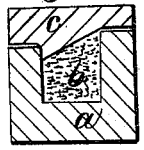
Witnesses:
Loudoun Francis McLean
William MacDuat Fleming
Inventor:
John Paterson Smith

JOHN PATERSON SMITH, OF GLASGOW, SCOTLAND.

Letters Patent No. 83,560, dated October 27, 1868.

IMPROVED TOOL FOR TURNING AND PLANING.

The Schedule referred to in these Letters Patent and making part of the same.

*To all whom it may concern:*

Be it known that I, JOHN PATERSON SMITH, of Glasgow, in the county of Lanark, Scotland, have invented certain new and useful "Improvements in Cutting-Tool Holders;" and I do hereby declare that the following is a full and exact description thereof, reference being had to the accompanying sheet of illustrative drawings, and to the figures and letters thereon; that is to say—

My invention relates to cutting-tool holders for use in turning, boring, planing, and analogous machines, where the cutting-surface requires to be peculiarly curved, to enable it to curl up and remove the chip smoothly and easily, and consists in a sheave, formed in its length in two parts, adapted, by rolling, or otherwise shaping to the proper form, to fit closely to the curved face, as well as to the other faces of the tool, and thus supporting the whole firmly.

I will proceed to describe what I consider the best means of carrying out my invention. The accompanying drawings form a part of this specification.

Figure 1 is a longitudinal view of my tool-holder and tool, and

Figure 3 is a cross-section.

The other figures represent other modes of construction, which possess more or less merit, and some of them may possess novelty, but which are not claimed in this patent. They will be readily understood from the drawing by good mechanics.

Referring to figs. 1 and 3, the lower or main part *a* of the tool-holder is formed of a rectangular section, and adapted to fit closely to the rectangular surface of the tool *b*. The upper part of the tool-holder *c* is adapted to fit closely to the curved surface of the tool, as represented. The whole is adapted to be held in a tool-post of a lathe, or in the cutter-head of a planer, or analogous tool-holding device, in the ordinary manner.

I propose to use my invention, in connection with an improvement for which an application for patent is filed, of even date herewith. In that patent, I provide for moulding tools, in any desired section, very accurately and cheaply, and of great hardness, but the tools so made are liable to be unusually brittle. My improved tool-holder is especially valuable, in connection with that invention, but I do not confine it thereto. It may obviously be used in connection with tools *b*, properly curved throughout their length, whether the said tools are moulded, rolled, or otherwise produced.

I am aware that many devices have been before known for holding small tools of hardened steel, by wedges, set-screws, and other devices, within cases somewhat analogous to mine, but I believe that I am the first to produce tools having a proper and uniform curvature on one of the faces throughout its whole length, so that it may be shifted along as the end is used and ground off, and held within a box or case, which applies to and supports such curved face.

I do not claim anything represented in Figures 2, 4, 5, 6, or 7; but

What I do claim as new, and as my invention, and desire to secure by Letters Patent, is—

The within-described formation and adaptation of the under surface of the part *c*, to fit tightly and firmly to the properly-curved surface of the tool *b*, the curvature of each being uniform through the whole length, by rolling, moulding, or otherwise, the part *c* and the tool being used, in combination with the part *a*, substantially as and for the purposes herein set forth.

In testimony whereof, I have hereunto set my name in presence of two subscribing witnesses.

JOHN PATERSON SMITH.

Witnesses:
W. L. DUFF, *U. S. Consul, Glasgow,*
JOSEPH CAIRNEY, *U. S. Consul's Clerk, Glasgow.*